US 8,849,502 B2

(12) United States Patent
Hiemenz et al.

(10) Patent No.: US 8,849,502 B2
(45) Date of Patent: Sep. 30, 2014

(54) COMPREHENSIVE AND RETROFITTABLE OCCUPANT SENSOR SUITE (CROSS)

(71) Applicants: Gregory J. Hiemenz, Silver Spring, MD (US); Datta Sheth, Gaithersburg, MD (US); Murat Yasar, Columbia, MD (US)

(72) Inventors: Gregory J. Hiemenz, Silver Spring, MD (US); Datta Sheth, Gaithersburg, MD (US); Murat Yasar, Columbia, MD (US)

(73) Assignee: Inno Vital Systems, Inc., Calverton, MD (US)

( * ) Notice: Subject to any disclaimer, the term of this patent is extended or adjusted under 35 U.S.C. 154(b) by 27 days.

(21) Appl. No.: 13/786,661

(22) Filed: Mar. 6, 2013

(65) Prior Publication Data
US 2014/0077538 A1    Mar. 20, 2014

Related U.S. Application Data

(60) Provisional application No. 61/607,171, filed on Mar. 6, 2012.

(51) Int. Cl.
*B60N 2/00* (2006.01)
*B60N 2/44* (2006.01)

(52) U.S. Cl.
CPC *B60N 2/002* (2013.01); *B60N 2/44* (2013.01); *B60N 2/00* (2013.01)
USPC ........................................ 701/33.4

(58) Field of Classification Search
USPC ........................................ 701/33.4
See application file for complete search history.

(56) References Cited

U.S. PATENT DOCUMENTS

| | | | | |
|---|---|---|---|---|
| 5,667,244 A * | 9/1997 | Ito et al. | | 280/735 |
| 7,822,522 B2 * | 10/2010 | Wereley et al. | | 701/45 |
| 8,311,705 B2 * | 11/2012 | Wang et al. | | 701/37 |
| 2005/0278094 A1 * | 12/2005 | Swinbanks et al. | | 701/37 |
| 2009/0055048 A1 * | 2/2009 | Sheynblat | | 701/38 |
| 2010/0179730 A1 * | 7/2010 | Hiemenz et al. | | 701/45 |
| 2011/0035118 A1 * | 2/2011 | Hiemenz et al. | | 701/45 |
| 2012/0176237 A1 * | 7/2012 | Tabe | | 340/539.12 |

* cited by examiner

*Primary Examiner* — Thomas Tarcza
*Assistant Examiner* — Alex C Dunn
(74) *Attorney, Agent, or Firm* — Ober, Kaler, Grimes & Shriver; Royal W. Craig (57) ABSTRACT

A Comprehensive and Retrofittable Occupant Sensor Suite (CROSS) for logging of accurate occupant dynamics during blast events encountered on the battlefield. The CROSS system is low cost, can be retrofit to any vehicle seat, will not restrict soldier mobility, and is highly expandable to include both wired and wireless sensors. The CROSS system reliably measures and sends all data channels to a vehicle data recorder (VDR), and internally stores data (with its own power backup) in case connectivity to the VDR or vehicle power is lost during a blast event. The CROSS system yields critical information for forensics analysis, the modeling of occupant dynamics during blast events, and the design of protective devices.

33 Claims, 4 Drawing Sheets

COMPREHENSIVE AND RETROFITTABLE OCCUPANT SENSOR SUITE (CROSS)

CROSS-REFERENCE TO RELATED APPLICATION(S)

The present application derives priority from U.S. Provisional Patent Application 61/607,171 filed 6 Mar. 2012.

BACKGROUND OF THE INVENTION

1. Field of the Invention

The present invention relates to sensor systems for vehicle seats and, more particularly, to a comprehensive and retrofittable occupant sensor suite (CROSS) for logging of accurate occupant dynamics, especially suited for logging of blast events encountered on the battlefield.

2. Description of the Background

Occupant survivability has become a top priority when designing military ground vehicles. In recent conflicts, over 4,400 casualties resulted from Improved Explosive Devices (IEDs), which account for over 60% of all casualties. Increased operational demand in areas with high IED potential has amplified the need for enhanced protection. A key element in the design of protective devices and systems is accurate battlefield data from such blast events. To date, however, there is a lack of useful battlefield data that is extracted from a blast event and usually only the size of the blast crater and number of injuries/casualties suffered is known. Due to the post-blast confusion, even occupant seating location and whether the occupant was properly restrained in the seat is often unknown. Vehicle Data Recorders (VDRs) are being implemented within some vehicles, but they only log data at the global vehicle level and do not provide information at the local occupant level. Blast overpressure and accelerations can vary significantly from one side of a vehicle to another, which current VDRs may not be able to capture. Further, VDRs cannot currently log actual loads experienced by the occupant or information such as whether the occupant was wearing seat belts, whether the seat energy absorber performed as expected, nor each occupant's seating location within the vehicle. This information is critical for forensics analysis, the modeling of occupant dynamics during blast events, and the design of protective devices.

Over the past decade, there have been significant advances in low-cost yet sophisticated electronics. Microelectromechanical systems (MEMS) sensors, solid-state mass storage devices, radio-frequency identification (RFID) systems, and multi-channel high performance digital signal processors (DSP) with wireless capabilities are providing highly advanced capabilities at a fraction of previous costs. What is needed is a Comprehensive and Retrofittable Occupant Sensor Suite (CROSS) that will accurately measure key information at the occupant level.

SUMMARY OF THE INVENTION

It is, therefore, an object of the present invention to provide a low-cost and highly expandable system for extraction of detailed and accurate vehicle battlefield data without interfering with the soldier's mobility or adding operational procedures. These and other objects are achieved herein by a Comprehensive and Retrofittable Occupant Sensor Suite (CROSS) for logging of accurate occupant dynamics during blast events encountered on the battlefield. The CROSS system is low cost, can be retrofit to any vehicle seat, will not restrict soldier mobility, and is highly expandable to include both wired and wireless sensors. The CROSS system reliably measures and sends all data channels to a vehicle data recorder (VDR), and internally stores data (with its own power backup) in case connectivity to the VDR or vehicle power is lost during a blast event. A window of the last data is stored internally and this ability is preserved during power loss by the backup battery. In addition, the backup battery provides sufficient time when power is lost for the system to complete an orderly sequential shutdown, avoiding data corruption. The CROSS system yields critical information for forensics analyses, the modeling of occupant dynamics during blast events, and the design of protective devices.

The system can be easily retrofit into any existing vehicle seat and can be integrated with an existing vehicle data recorder (VDR). The CROSS system measures at least the following parameters using an expandable architecture:

Accelerations at the base of each seat (i.e., blast acceleration inputs)

Accelerations at the interface between the seat and occupant pelvis (i.e., seat cushion)

Restraint (seat belt) loads (and thus whether they were employed)

Stroking load of the seat's blast energy absorber (EA), if available

BRIEF DESCRIPTION OF THE DRAWINGS

Other objects, features, and advantages of the present invention become more apparent from the following detailed description of the preferred embodiments and certain modifications thereof when taken together with the accompanying drawings in which.

DETAILED DESCRIPTION OF THE PREFERRED EMBODIMENT

Figure 1:
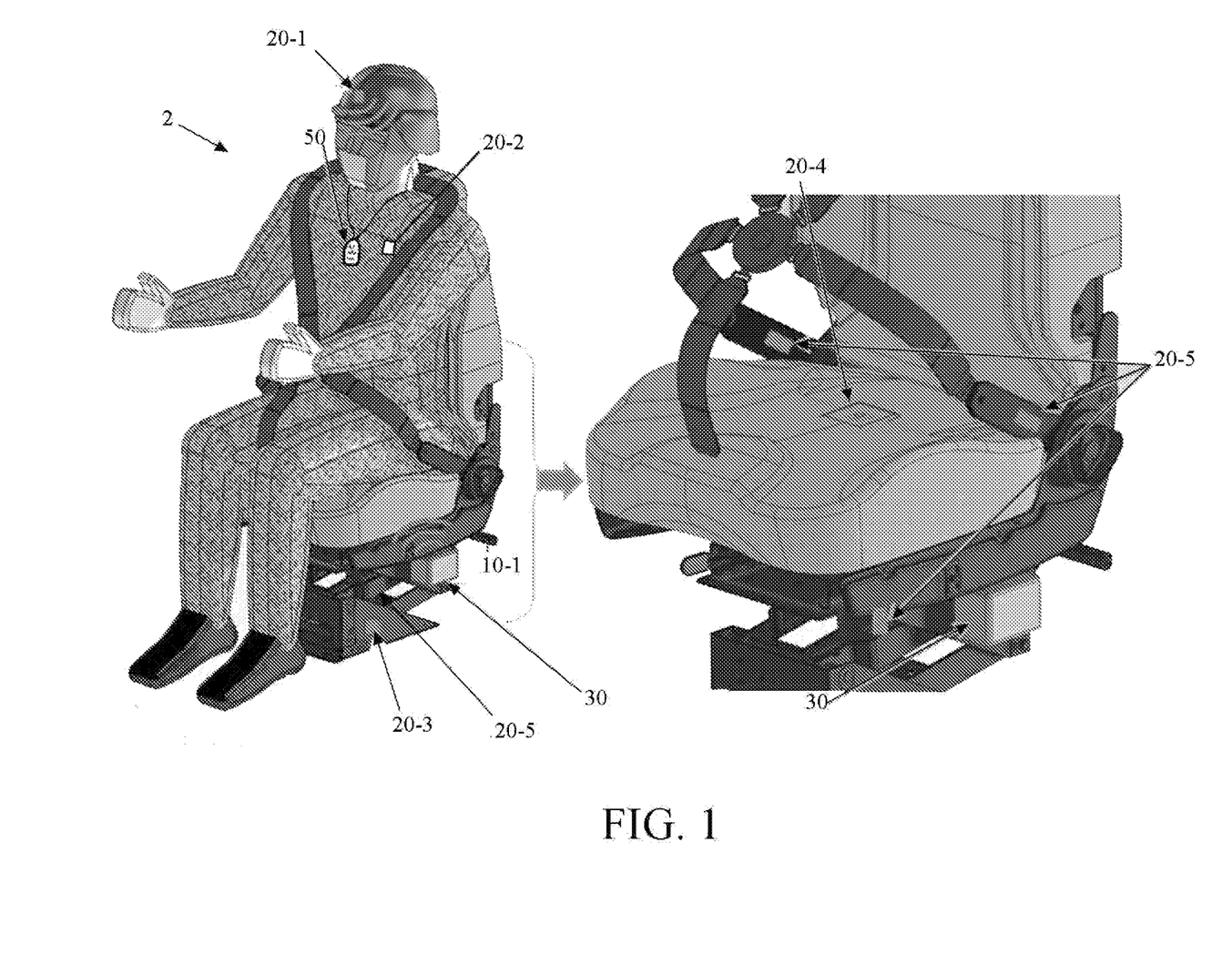
FIG. 1 is a perspective view of the present invention retrofit onto a representative seat.

With reference to FIG. 1, the present invention is a Comprehensive and Retrofittable Occupant Sensor Suite (CROSS) 2 that accurately measures key information at the occupant level. The system 2 can be easily retrofit into any existing vehicle seat and can be integrated with an existing vehicle data recorder (VDR). The CROSS system measures at least the following parameters:

Accelerations at the base of each seat (i.e., blast acceleration inputs)

Accelerations at the interface between the seat and occupant pelvis (i.e., seat cushion)

Restraint (seat belt) loads (and thus whether they were employed)

Stroking load of the seat's blast energy absorber (EA), if available

The system connects a plurality of wired sensors 10-1 . . . n, wireless sensors 20-1 . . . n, and an identification (ID) transponder 50, through a CROSSPod module 30. The embodiment of FIG. 1 includes a wired displacement sensor

10-1, two wireless body-mounted accelerometers 20-1, 20-2, a wireless seat foundation accelerometer 20-3, a MEMs accelerometer 20-4 sewn into the seat cushion cover, and (as seen in the enlarged inset) one or more calibrated strain gauges 20-5 to measure restraint foundation and stroking loads. An ID transponder 50 is provided in the form of an radio frequency identification device (RFID) dogtag which emits a soldier ID when polled, though one skilled in the art should understand that the ID transponder 50 can be integrated in other forms such as in forms such as in the helmet, vest of other clothing, or the ID function can be consolidated into one of the wireless sensors 20-1 . . . 5.

As described in more detail below, the wired sensors 10-1 . . . n may include any one from the group of a displacement sensor, a blast pressure sensor, seat pan or foot pad pressure map sensors, and additional seat pan or seat back accelerometers. The wireless sensors 20-1 . . . n are likewise described in more detail below and may include occupant worn sensors. All sensors 10-1, 20-1, 20-2, 20-3, 20-4, 20-5 and RFID dogtag 10 securely transfer their data to the CROSSPod module 30 which is mounted to the seat. The CROSSPod 30 serves several functions:

Act as a receiver hub for both wired and wireless sensor and soldier ID signals
Provide analog-to-digital (A/D) conversion
Provide anti-aliasing filtering and signal processing, as required
Provide power to the sensors, as required
Send all signals to VDR
Provide a redundant storage in the case of VDR failure By using reliable, advanced electronics and an innovative, retrofit capable sensor arrangement, the low-cost and highly expandable CROSS system 2 enables the extraction of detailed and accurate battlefield data without interfering with the soldier's mobility or adding operational procedures.

Figure 2:
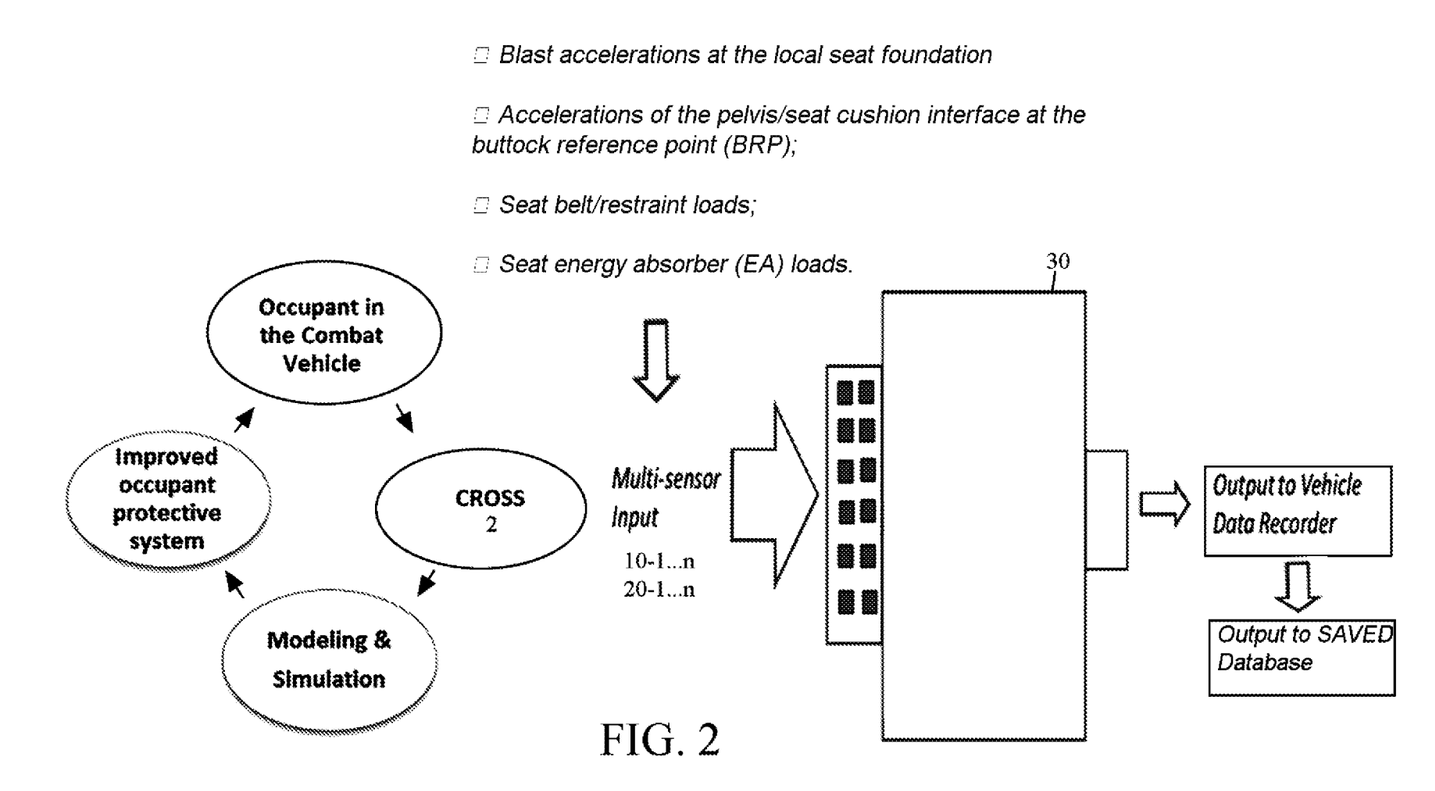
FIG. 2 illustrates the role of the CROSS system in occupant protection system design.

FIG. 2 is a flow diagram illustrating the data flow of the CROSS System 2. The system 2 is designed to greatly improve dynamic modeling and design of occupant protective systems to provide a correct understanding of the threats encountered on the battlefield, improve the design of occupant protection systems, and reduce injury risk to the warfighter. The CROSS system 2 also has a substantial impact outside of blast events. Occupational safety during non-hostile missions and training has also become a significant concern due to increased frequency of long duration missions. Long-term exposure to whole body vibration (WBV) and repetitive shock during military vehicle operation has recently been linked to chronic injuries, fatigue, and loss of situational awareness. Such WBV and repetitive shock related injuries have been shown to retire highly trained soldiers earlier than anticipated and bear very high long-term costs for the military. Output data from the CROSS system 2 may be recorded locally at the vehicle data recorder (VDR) and used to populate a Shock and Vibration Exposure Database (SAVED) that allows for tagged logging and monitoring of each soldier's exposure levels (per ISO 2631 or equivalent metric) to reduce risk of long-term injury. This is highly valuable in: 1) preventing chronic injuries to these valuable military personnel; and 2) providing medical professionals the data they need treat/prevent chronic injuries; and 3) reducing long-term health care costs for the military.

The CROSS system 2 measures any one or more of the following:
Blast accelerations at the local seat foundation (crucial to understanding the inputs to the seat/occupant system).
Accelerations of the pelvis/seat cushion interface at the buttock reference point (BRP) (yield the loading input into the seat-supported portion of the occupant . . . these accelerations can be used to obtain an estimate of spinal loading and spinal injury risk).
Seat belt/restraint loads to determine if occupant was wearing harness, to evaluate upper torso dynamics and propensity for plunging forward, to evaluate whether the occupant was sliding forward in the seat (i.e., "submarining"), and to evaluate chest injury risk.
Seat energy absorber (EA) loads to determine whether the seat EA stroked at the desired load and, with knowledge of the pelvis/seat cushion accelerations, evaluate the effect of the seat structure and cushion dynamics on the seat/occupant system.

The blast accelerations and pelvis/seat cushion accelerations are accurately measured with the tri-axial MEMS accelerometers 20-3 mounted rigidly to the seat frame and/or 20-4 embedded into a retrofittable seat cushion cover.

Seat belt/restraint and EA loads are measured by the calibrated strain gauges 20-5 or strain gauged bolts at each mounting location.

The CROSS system 2 is expandable to include the addition of other wired 10 or wireless sensors 20, as required, to improve the understanding of occupant and blast dynamics. Such additional sensors could be:

Additional MEMS accelerometers embedded into a retrofittable seat back cushion cover or rigid seat pan to measure additional inputs into the occupant and seat dynamics;
A displacement sensor (string potentiometer, LVDT, etc.) to seat stroking distance;
A MEMS pressure sensor to log the localized blast overpressure experienced;
Thin film force/pressure mapping sensors under the seat cushion to measure load into the buttocks & thighs through seat pan;
Thin film force/pressure mapping sensors at the foot/floor interface to measure loads transmitted to the legs directly from the floor.

The blast accelerations and pelvis/seat cushion accelerations are accurately measured with the tri-axial MEMS accelerometers 20-3 mounted rigidly to the seat frame and/or 20-4 embedded into a retrofittable seat cushion cover.

Seat belt/restraint and EA loads are measured by the calibrated strain gauges 20-5 or strain gauged bolts at each mounting location.

The soldier-worn wireless sensors 20-1, 20-2 are preferably passive battery-operated devices that wake upon a blast event. They remain in standby mode and do not transmit or draw power. Upon a blast, these sensors 20-1, 20-2 are triggered and store the acceleration data. This data is transferred to the CROSSPod 30 only after an extreme event (a blast) is over. This post-event data transmission of system 2 avoids electromagnetic interference (EMI) issues that may otherwise arise. The use of such sensors allow for hi-fidelity measurement at discrete locations of concern on the occupant without impeding the soldier's mobility. As noted above, a separate RFID dogtag 50 may be provided, or alternatively, any of the soldier-worn wireless sensors 20-1, 20-2 may be assigned a unique soldier ID code. By tagging the dogtag 50 and/or wireless sensors 20-1, 20-2 with a soldier ID code, it is possible to pinpoint solder seating locations within the vehicle post-blast. This is accomplished using radio frequency (RF) capable digital signal processors (DSP) and RFID tagging as described below All data measured by the expandable sensor suite 10-1 . . . n, 20-1 . . . n is received by the multi-functional CROSSPod 30 mounted to (or near) the seat.

Figure 3:
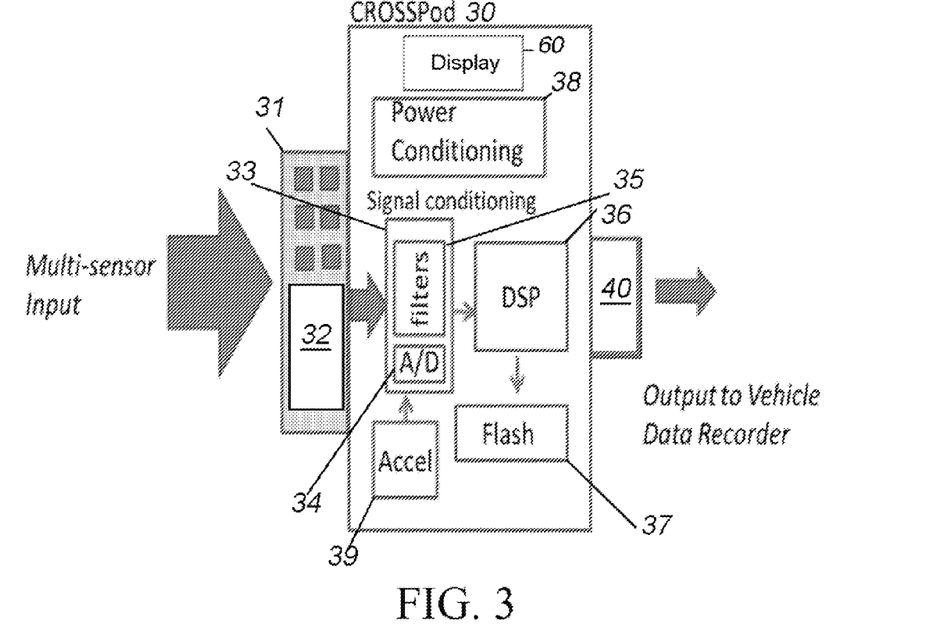
FIG. 3 is a block diagram of the CROSS Pod Architecture.

FIG. 3 is a block diagram of the CROSSPod 30 system architecture. The CROSSPod 30 comprises a sensor connector bank 31 with a plurality of connectors for wired sensors 10-1 . . . n. If necessary, a transceiver 32 is provided for communicating with wireless sensors 10-1 . . . n, 20-1 . . . n, though a digital signal processor (DSP) 36 may include an internal transceiver to perform this function. The sensor data is subjected to a signal conditioning module 33 which includes an analog-to-digital (A/D) converter 34 and anti-aliasing filter(s) 35 for preventing aliasing in the conversion of said analog sample data into a continuous digital signal. The filtered digital data is processed by DSP 36, as required, and at least a window of the most recent processed data is stored locally on a solid state flash media 37. In operation, the oldest data will be discarded in favor of newly acquired data in a first-in, first-out (FIFO) buffering process.

The CROSSPod 30 is powered by the existing 28V vehicle supply and includes power conditioning circuit 38 as needed for military standard MIL-STD-1275. It preferably includes a battery backup (not shown) in the event of vehicle power failure during the blast event. All circuitry complies with the Society of Automotive Engineers standard SAEJ211. The data from the CROSSPod 30 is transferred to the VDR using standard interface protocols such as CAN/RS232. There may be an on-board display 60 with graphical user Interface (GUI) to import, save, and monitor the occupant data. "On-board display" is typically used for LCD type display or a display screen which will be on the unit.

Connector 40 is a connector to for transferring the data to either VDR or other remote computer. In addition to blast/shock events, the CROSS system 2 measures occupant exposure to shock and vibration during normal operating conditions and tags the occupant identity to this data. This facilitates collection of epidemiological data illustrating that occupations with constant exposure to whole-body vibrations (WBV) are at greater risk of low back pain, sciatic pain, and herniated lumbar disc. In military ground vehicles, occupants are continuously exposed to significant shock and vibration. There is also an increased risk of developing degenerative changes in the spine, including lumbar intervertebral disc disorders. There are guidelines provided by ISO 2631-1 and ISO 2631-5 standards on tolerable exposure durations for the human body before long-term injuries occur. In normal operating conditions, the CROSS system 2 logs the occupant's vibration exposure and the data is tracked and monitored in a Shock and Vibration Exposure Database (SAVED) to ensure operational safety is maintained for all occupants. Because the recorded data is tagged with a soldier identification code it benefits the medical professionals in their treatment. Tagging of the data may be achieved by sensors 10-1 . . . n, 20-1 . . . n encoded directly with soldier IDs as indicated above, or by having a very small wireless tag (RFID or RF capable DSP encoded with ID code) integrated into the soldiers "dog tag" or elsewhere on his or her uniform which is polled by the CrossPod 30 on the seat. A more detailed explanation of certain system components will now be provided.

Sensors 10, 20

Sensors may include: 1) accelerometers mounted to the seat foundation to measure blast input to the seat/occupant system, 2) accelerometers embedded into a retrofittable seat cushion cover to measure input to the pelvis, 3) calibrated strain gauges or other force transducers at the foundations of the 4- or 5-point harness to measure forces in the occupant restraint system for determining occupant dynamics and whether or not they were properly employed, 4) calibrated strain gauges or other force transducers on the seat's blast energy absorber to measure seat stroking loads, 5) displacements sensors to measure seat stroke, 6) air pressure sensors to measure blast overpressure, 7) pressure mapping film sensors to measure input from floor to feet or seat pan to pelvis loading, and 8) miniature wireless accelerometer nodes embedded within the soldier's helmet, vest, etc. An important feature of the CROSS system is its expandability to include from only critical measurements to a full suite of auxiliary measurements, based upon the customer's need. Specific examples follow:

Force Sensors

There are several methods of measuring force. Traditional force transducers (or load cells) available commercially, however, tend to be quite expensive.

Figure 4:
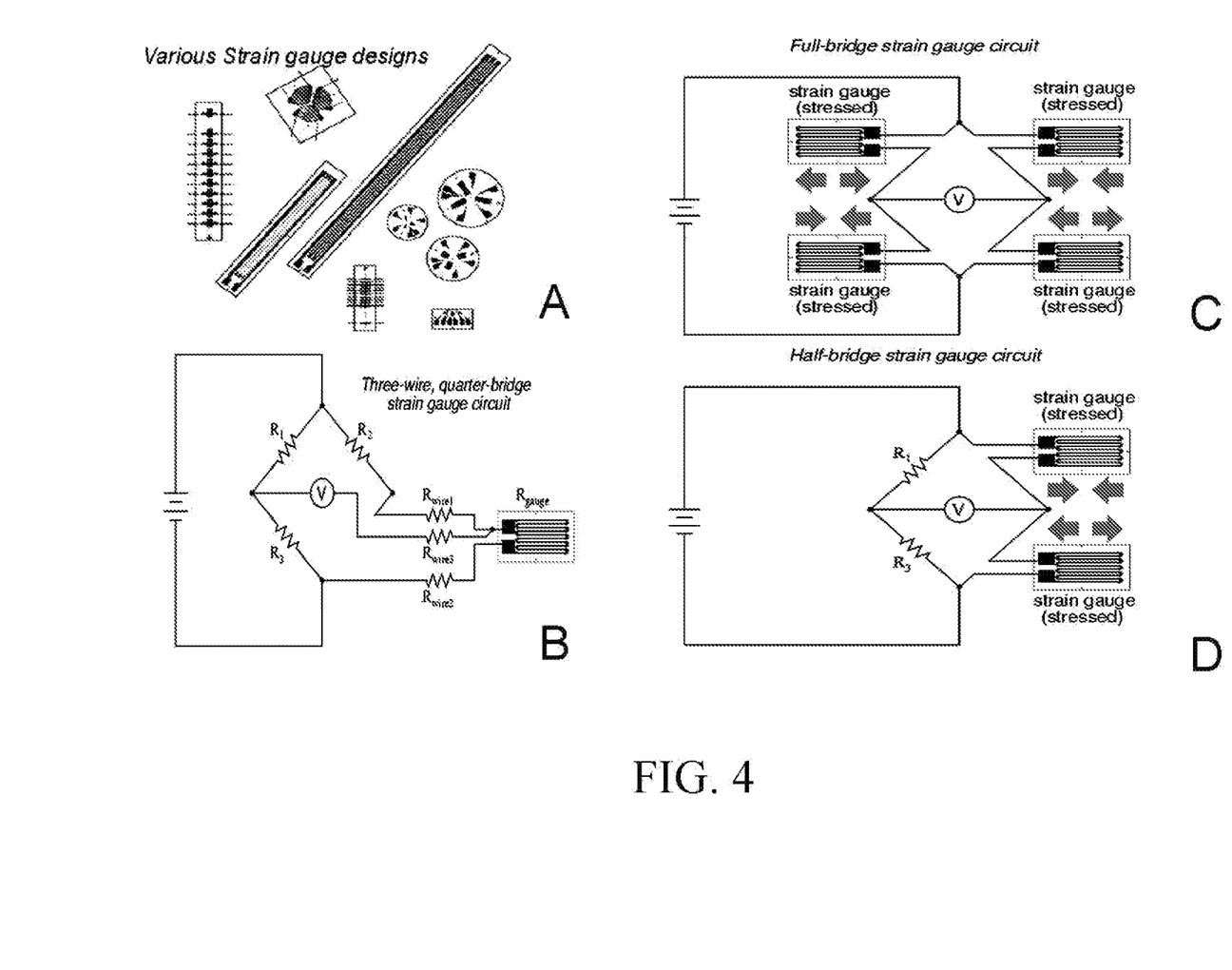
FIG. 4 illustrates various types of strain gauges and conditioning circuits suitable for use in the present invention.

FIG. 4 (A-D) illustrates various types of strain gauges and conditioning circuits suitable for use. A strain gauge, a low-cost sensor whose electrical resistance varies based on the strain of the article to which it is attached. Strain is defined as a fractional change in length, and it varies directly with the applied load. By sensing strain and knowing the physical characteristics (geometry and stress-strain curves) of the structural member to which the load is applied, the applied force can be accurately calculated. As such, calibrated strain gauges are used on the seat restraint harness foundation and on the seat's blast energy absorber as a low-cost method for measuring forces applied to the occupant. Strain gauges may be applied to structural components (mounting bracketry) or embedded in mounting bolts—a widely used methodology in the auto industry to measure force.

Strain gauge measurements involve sensing extremely small changes in the resistance. Therefore selection and use of appropriate signal conditioning, wiring and data acquisition are required for reliable measurements. Ideally the resistance of the strain gauge should change only in response to the applied strain. However, strain gauge material, as well as the specimen material to which the gauge is applied responds to the change in temperature. Temperature compensation is required in such cases. The CROSS system 2 optimizes the signal conditioning such that it has sufficient sensitivity and is also well compensated for the broad temperature range. As strain gauges are small, light, and very inexpensive this method of force sensing offers a much lower cost and lower weight alternative to traditional force transducers (load cells) while maintaining sufficient accuracy and reliability.

Low-cost, flexible film force sensors may also be used to measure contact force/pressure at the foot/floor and seat cushion/seat pan interfaces.

Figure 5:
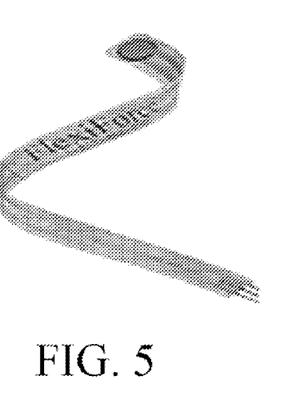
FIG. 5 is a perspective drawing of a suitable "FlexiForce" Sensor.

FIG. 5 is a perspective drawing of a suitable "FlexiForce" Sensor. The flexible film force sensor acts as a force sensing resistor in an electrical circuit. When the force is unloaded, the resistance is very high, and it decreases corresponding to the force applied. The film sensors from FlexiForce™ are constructed of two layers of substrate. On each layer, a conductive material (silver) is applied, followed by a layer of pressure-sensitive ink. Adhesive is then used to laminate the two layers of substrate together to form the force sensor. The active sensing area is defined by the silver circle on top of the pressure-sensitive ink. Silver extends from the sensing area to the connectors at the other end of the sensor, forming the conductive leads. These types of sensors (Error! Reference source not found.) are known to have better linearity and stable output with respect to load area.

There are also Piezo film element offered in the flexible leads or silver ink screen printed electrodes which can be used as a substitute for strain gauges.

Shock and Vibrations Sensors

Conceptually, an accelerometer behaves as a mass-spring-damper system. When the accelerometer casing is accelerated, the mass (which tends to resist acceleration due to laws of inertia) causes the spring (typically in the form of a cantilevered beam) to deflect. The spring deflection is then measured to yield the acceleration. Low-cost piezoelectric, piezoresistive, and/or, differential capacitance MEMS accelerometers are used in the present system. In piezoelectric-based accelerometers, the spring itself is made from piezoelectric material and, when strained, the quartz or ceramic crystals generate an electrical output that is proportional to applied acceleration. The piezoelectric effect produces an opposed accumulation of charged particles on the crystal. This charge is proportional to applied force or stress. In a piezoresistive accelerometer, the springs (or beams) made of a crystal semiconductor material which, when strained change resistance due to changes in inter-atomic spacing. This piezoresistive effect is similar to a strain gauge, and similar signal conditioning circuitry is often included in the package. Finally, differential capacitance accelerometers have differential capacitor unit cells. Each cell is composed of fixed plates attached to the device layer and movable plates attached to the sensor frame. Displacement of the sensor frame changes the differential capacitance. On-chip circuitry is able to measure the capacitive change.

Figure 6:
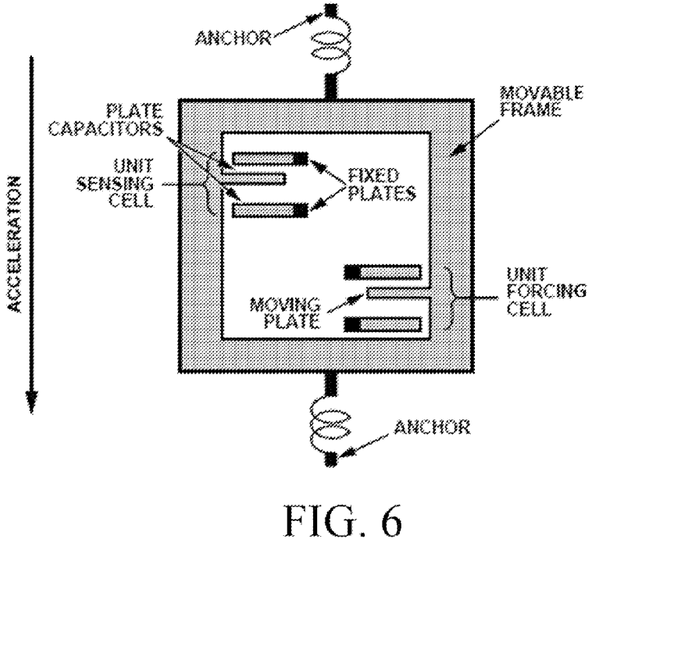
FIG. 6 depicts a Differential Capacitance MEMS Accelerometer and the behavior of that MEMS accelerometer under acceleration.

Microelectromechanical systems (MEMS) are defined as the integration of mechanical elements, sensors, actuators, and electronics on a common silicon substrate through microfabrication technology. The electronics are fabricated using integrated circuit (IC) process sequences and the micromechanical components are fabricated using compatible micromachining processes that selectively etch away parts of the silicon wafer or add new structural layers to form the mechanical and electromechanical devices. This allows the production highly reliable, exceptionally rugged and low cost acceleration sensor. FIG. 6 depicts a Differential Capacitance MEMS Accelerometer and the behavior of that MEMS accelerometer under acceleration.

RFID Communication

By tagging the data from wireless sensors 20-1, 20-2 with a soldier ID code, it is possible to pinpoint solder seating locations within the vehicle post-blast. This is accomplished using RFID. Radio-frequency identification (RFID) is a dedicated short range communication technology that uses radio waves to automatically identify people or objects. With RFID, the electromagnetic or electrostatic coupling in the RF portion of the electromagnetic spectrum is used to transmit a signal. The main component of the RFID system is a tag or transponder. Referring back to FIG. 1 an RFID tag 50 is shown in the form of a dog tag. The tag 50 responds to a signal from the CROSSPod 30 or other interrogator (reader/writer/antenna) and in turn broadcasts a signal back. The tag 50 can be either active or passive. Passive tags use the radio frequency from the reader to transmit the signal. Active tags are much more sophisticated and have on-board battery for power to transmit their data signal over a greater distance and powered random access memory (RAM) giving them the ability to store data. A passive tag can be easily made in the dog-tag size and worn around the neck, and so is herein contemplated. On the other hand, an active tag can be made only as small as a credit card size since it needs onboard battery and memory and a processor. Because passive tags need to be activated by the reader in order to get information from it, the operation range is limited to about 1-3 meters, whereas an active tag can easily communicate up to 100 meters or more.

RF System on Chip [RF SoC]

With the increasing need for RF communication in applications such as asset tracking, wireless data communication for sensor networks, and home and industrial automation, a solution that combines a low power digital signal processing capability and an RF transceiver function in one package is highly desirable. The RF SoC solutions from leading technology companies like Texas Instruments combines microcontroller system-on-chip configurations with a high performance state-of-the-art sub-1-GHz RF transceiver. Such chips also have up to 32 kB of in-system programmable flash memory, up to 4 kB of RAM, two 16-bit timers, a high performance 12-bit A/D converter with six external inputs plus internal temperature and battery sensors, comparator, universal serial communication interfaces (USCI), 128-bit AES security accelerator, hardware multiplier, DMA, real-time clock module with alarm capabilities, and up to 30 I/O pins. The use of these low-cost, highly capable microprocessors make it possible to uniquely identify the occupant to the blast data at a much lower cost and it is a more compact solution than an active RFID tag, while yielding a better communication range than a passive RFID tag.

Mean Time Before Failure (MTBF) Analysis

Reliability is currently recognized as an essential need in military electronic systems. Reliability is a means of reducing cost from the factory where rework of defective components adds a non-productive overhead expense, to the field, where repair costs includes not only parts and labor but also transportation. Every aspect of an electronic system, from the purity of the materials used in its component devices to the operator's interface has an impact on reliability. Therefore, while designing the CROSS system, close attention was paid to reliability of all the electronic components (diodes, resistors, IC's) to ensure that the system is reliable for at least 20 years.

Software

The embedded software aboard the CROSSPod 30 functionally accomplishes the following tasks 1) retrieves data from sensors, 2) user-tag & post-processes the data, 3) stores data into memory appropriately, and 4) communicate with the vehicle data recorder. This embedded software includes a built-in-test (BIT) functionality with visual alerts to ensure system functionality. As seen in FIG. 3 there may be display 60 with a graphical user interface (GUI) for ease of retrieving and post processing the data.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. In combination with a vehicle, a seat mounted in said vehicle, and an occupant of said seat, a vehicle data sensor system for monitoring loads experienced by the occupant of a vehicle seat, said vehicle sensor system comprising:

a plurality of sensors including at least one sensor worn by said occupant for monitoring a force parameter of said occupant, and at least one sensor mounted on said vehicle seat for monitoring a force parameter of said vehicle seat;

a data hub in communication with all of said plurality of sensors, said data hub further comprising:

an input connector having a plurality of data input channels for connection to said plurality of sensors;

a wireless receiver for wireless communication with said plurality of sensors;

an analog-to-digital (A/D) converter;

an output for communication with a data recorder;

a digital processor programmed with control software comprising computer instructions stored on non-transitory computer memory for polling said plurality of sensors during a shock event, digitizing polled data, and outputting said digital data from said output connector to said data recorder for recordation and forensics analysis.

2. The vehicle data sensor system according to claim 1, wherein said plurality of sensors includes at least one sensor mounted on said vehicle for monitoring a force parameter of said vehicle.

3. The vehicle data sensor system according to claim 1, wherein said plurality of sensors includes a combination of wired and wireless sensors.

4. The vehicle data sensor system according to claim 1, wherein said plurality of sensors includes a first acceleration sensor for sensing accelerations at a base of said vehicle seat, and a second acceleration sensor for sensing accelerations at an interface between said vehicle seat and said occupant.

5. The vehicle data sensor system according to claim 1, wherein said seat mounted in said vehicle comprises a seat harness for said occupant, and said plurality of sensors includes a first sensor for sensing loads or strains in said seat harness.

6. The vehicle data sensor system according to claim 1, wherein said seat mounted in said vehicle comprises a seat blast energy absorber, and said plurality of sensors includes a second sensor for sensing a stroking load or strain of said seat blast energy absorber.

7. The vehicle data sensor system according to claim 1, further comprising a unique ID code associated with said occupant, said digital processor control software comprising computer instructions for tagging said digital data output from said output connector to said data recorder with said unique ID code.

8. The vehicle data sensor system according to claim 1, wherein said data hub further comprises internal flash memory, and said digital processor control software includes computer instructions for outputting the digital data to said internal flash memory.

9. The vehicle data sensor system according to claim 1, wherein said output further comprises an electrical connector for communication with an external vehicle data recorder (VDR).

10. The vehicle data sensor system according to claim 1, wherein said output further comprises an internal connection to an internal data logger.11.

11. The vehicle data sensor system according to claim 1, wherein said data hub further comprises an anti-aliasing filter for preventing aliasing in the conversion of said analog sample data into a continuous digital signal.

12. The vehicle data sensor system according to claim 5, wherein said digital processor is programmed with software comprising computer instructions stored on non-transitory computer memory for polling said plurality of sensors to measure at least the following parameters:

acceleration at a base of said vehicle seat;

acceleration at an interface between the vehicle seat and said occupant; and load to said harness.

13. The vehicle data sensor system according to claim 12, wherein said plurality of sensors additionally measure stroking load of said blast energy absorber.

14. The vehicle data sensor system according to claim 12, wherein said unique ID code associated with said occupant is stored in computer memory on an RFID chip worn by said occupant.

15. The vehicle data sensor system according to claim 1, wherein said plurality of sensors includes any two or more from among a group consisting of a displacement sensor, a blast pressure sensor, a strain gage, a pressure map sensor, and an accelerometer.

16. The vehicle data sensor system according to claim 15, wherein said two or more sensors includes at least one wireless sensor and at least one wired sensor.

17. The vehicle data sensor system according to claim 1, wherein said data hub is attached to said vehicle seat.

18. The vehicle data sensor system according to claim 15, wherein said plurality of sensors includes a tri-axial MEMS accelerometer mounted rigidly to a frame of said vehicle seat.

19. The vehicle data sensor system according to claim 15, wherein said plurality of sensors includes a tri-axial MEMS accelerometer embedded in a seat cushion cover.

20. The vehicle data sensor system according to claim 16, wherein said plurality of sensors includes a calibrated strain gauge.

21. The vehicle data sensor system according to claim 16, wherein said plurality of sensors includes a sensor for measuring contact pressure at a foot/floor interface.

22. The vehicle data sensor system according to claim 6, wherein said plurality of sensors includes a sensor for measuring contact pressure at a cushion/seat pan interface.

23. The vehicle data sensor system according to claim 1, wherein said data hub further comprises a digital signal processor.

24. In combination with a vehicle, a seat mounted in said vehicle, and an occupant of said seat, a vehicle data sensor system for monitoring loads experienced by the occupant of a vehicle seat, said vehicle sensor system comprising:

a plurality of sensors including at least one sensor worn by said occupant for monitoring a force parameter of said occupant, and at least one sensor mounted on said vehicle seat for monitoring a force parameter of said vehicle seat;

an RFD tag worn by said occupant, said RFD tag storing a unique ID code associated with said occupant;

a data hub in communication with all of said plurality of sensors, said data hub further comprising:

an input connector having a plurality of data input channels for connection to said plurality of sensors;

an analog-to-digital (A/D) converter;

an output for communication with a data recorder; and a digital processor programmed with control software comprising computer instructions stored on non-transitory computer memory for polling said plurality of sensors during a shock event, digitizing polled data, tags said digital data with said unique ID code, and outputs said tagged digital data from said output connector to said data recorder for recordation and forensics analysis.

25. The vehicle data sensor system according to claim 24, further comprising a wireless receiver for wireless communication with said plurality of sensors.

26. The vehicle data sensor system according to claim 24, wherein said control software also polls said plurality of sensors during normal vehicle operation for vibration, digitizes polled vibration data, tags said digital vibration data with said unique ID code, and outputs said tagged digital data from said output connector to said VDR for recordation and forensics analysis.

27. The vehicle data sensor system according to claim 24, wherein said data hub comprises an RFID reader.

28. The vehicle data sensor system according to claim 24, wherein said digital processor is programmed with control software comprising computer instructions stored on non-transitory computer memory for polling said plurality of sensors to measure at least the following parameters:
   acceleration at a base of said vehicle seat;
   acceleration at an interface between the vehicle seat and said occupant; and
   load to said harness.

29. The vehicle data sensor system according to claim 28, wherein said plurality of sensors includes any two or more from among a group consisting of a displacement sensor, a blast pressure sensor, a strain gauge, a pressure map sensor, and an accelerometer.

30. The vehicle data sensor system according to claim 29, wherein said plurality of sensors includes a tri-axial MEMS accelerometer.

31. The vehicle data sensor system according to claim 29, wherein said plurality of sensors includes a calibrated strain gauge.

32. The vehicle data sensor system according to claim 29, wherein said plurality of sensors includes a sensor for measuring contact pressure at a foot/floor interface.

33. The vehicle data sensor system according to claim 29, wherein said plurality of sensors includes a sensor for measuring contact pressure at a cushion/seat pan interface.

* * * * *